US011533398B2

(12) United States Patent
Loftus et al.

(10) Patent No.: US 11,533,398 B2
(45) Date of Patent: Dec. 20, 2022

(54) SYSTEM AND METHOD FOR OPTIMIZING AGENT TIME

(71) Applicant: Avaya Inc., Santa Clara, CA (US)

(72) Inventors: Liam Loftus, Knocknacarra (IE); Neil O'Connor, Lackagh (IE); Tommy Moran, Galway (IE); Seamus Hayes, Clarinbridge (IE); Paul D'Arcy, Limerick (IE)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/546,672

(22) Filed: Aug. 21, 2019

(65) Prior Publication Data

US 2019/0379790 A1 Dec. 12, 2019

Related U.S. Application Data

(63) Continuation of application No. 14/672,409, filed on Mar. 30, 2015, now Pat. No. 10,425,534.

(51) Int. Cl.
*H04M 3/51* (2006.01)
*H04M 3/22* (2006.01)
*H04M 3/58* (2006.01)

(52) U.S. Cl.
CPC ....... *H04M 3/5175* (2013.01); *H04M 3/2281* (2013.01); *H04M 3/5166* (2013.01); *H04M 3/58* (2013.01)

(58) Field of Classification Search
CPC ............ H04M 3/5175; H04M 3/2281; H04M 3/5166; H04M 3/58

USPC ................................................... 379/212.01
See application file for complete search history.

(56) References Cited

U.S. PATENT DOCUMENTS

| | | | | |
|---|---|---|---|---|
| 6,535,492 | B2* | 3/2003 | Shtivelman | H04L 12/1831 370/270 |
| 2004/0162724 | A1* | 8/2004 | Hill | G10L 15/1822 704/231 |
| 2006/0203993 | A1* | 9/2006 | Busey | H04M 3/5191 379/265.09 |
| 2015/0063556 | A1* | 3/2015 | Uba | H04M 3/5175 379/265.05 |

* cited by examiner

*Primary Examiner* — Ahmad F. Matar
*Assistant Examiner* — Jirapon Intavong (57) ABSTRACT

A method and system automatically optimizes agent time. The method performed by a transferring device includes monitoring a communication session between an agent device used by an agent of the contact center and a user device used by a user. The communication session including first communications generated by the agent and second communications generated by the user. The method includes determining when the communication session is to be transferred from the agent device to an automated system of the contact center. The automated system is configured to perform the communication session by generating third communications for the second communications. The method includes generating a control signal upon determining the communication session is to be transferred that is configured to automatically transfer the communications session from the agent device to the automated system.

20 Claims, 4 Drawing Sheets

SYSTEM AND METHOD FOR OPTIMIZING AGENT TIME

RELATED APPLICATIONS

This application is a continuation of U.S. patent application Ser. No. 14/672,409, entitled "System and Method for Optimizing Agent Time," filed Mar. 30, 2015, which is hereby incorporated by reference in its entirety.

BACKGROUND INFORMATION

A contact center may be used by a provider to initiate a session that enables a user to request information and/or have an issue or service handled by the provider addressed. The contact center may be equipped with an automated system that requests information from the user to properly provide the requested service. Specifically, the automated system may receive initial information to generally determine a category of the requested service. Subsequently, the contact center may forward the session to an agent or continue utilizing the automated system.

The session may be performed in a variety of different manners. In a first manner, the session may be performed in non-real-time such as with email. In a second manner, the session may be performed in real-time or near real-time. For example, in real-time, the automated system may provide voice prompts over a voice and/or video communication such as a telephone/video call in which the information is requested. In another example, in near real-time, the automated system may provide input fields in a session form that the user enters prior to the session being initiated. Subsequently, the automated system may activate the session as a chat session. In a further example, the chat session may be activated immediately in which the information is requested during the chat session.

When the sessions are performed by the contact center as a chat session, the contact center may select when to forward the chat session to an agent. For example, a forwarding procedure may be performed in a seamless manner where the agent is provided a transcript and/or other information of the exchange between the automated system and the user to continue the chat session as if the agent had been participating the entire time. Furthermore, the agent may handle multiple concurrent chat sessions depending upon how many users the agent is selected to interact. When such a scenario presents itself, the agent may be incapable of providing responses in a timely manner that may cause the user to terminate the chat session early.

Although creating a negative user experience, the agent being inundated with sessions also creates an inefficient use of the contact center. Conventional automated systems are only configured to transfer the session from the automated system to the agent so that the agent may continue the chat session until its completion. During peak times where the agents are occupied to capacity with sessions, the agents may no longer be able to take on any further sessions. The surplus users will therefore be kept waiting until an agent becomes available which furthers the inefficient use of the contact center.

Thus, there is a need for a system and method to determine a manner of utilizing the automated system in a more efficient manner to increase optimization of an agent time.

DETAILED DESCRIPTION

The exemplary embodiments may be further understood with reference to the following description and the related appended drawings, wherein like elements are provided with the same reference numerals. The exemplary embodiments are related to a system and method for optimizing an agent time through improved use of an automated system. Specifically, the exemplary embodiments provide a mechanism in which a session being handled by an agent using an agent device is automatically transferred therefrom to the automated system. Accordingly, the agent being a finite resource is freed up to allow further sessions to be handled thereby. The contact center, the automated system, the agent, the agent device, the transfer mechanism, and a related method will be described in further detail below.

Initially, it should be noted that the exemplary embodiments described herein relate to a contact center that receives queries or requests (herein collectively referred to as "requests"). However, those skilled in the art will understand that the exemplary embodiments may be applied to any system in which an agent communicates over a real-time or near-real-time (herein collectively referred to as "real-time") communication with a user having the request. Thus, the contact center used herein may represent any of these systems. It should also be noted that the use of the agent and the user is only exemplary. Those skilled in the art will also understand that the exemplary embodiments may be applied to any first user who represents a first party to the real-time communication with any second user who represents at least one second party to the real-time communication. It should also be noted that the exemplary embodiments described herein relate to a real-time communication being a chat session. As such, the session and chat session may be used interchangeably herein. However, those skilled in the art will understand that the use of the chat session is only exemplary and the exemplary embodiments may utilize any time-related communication functionality.

Figure 1:
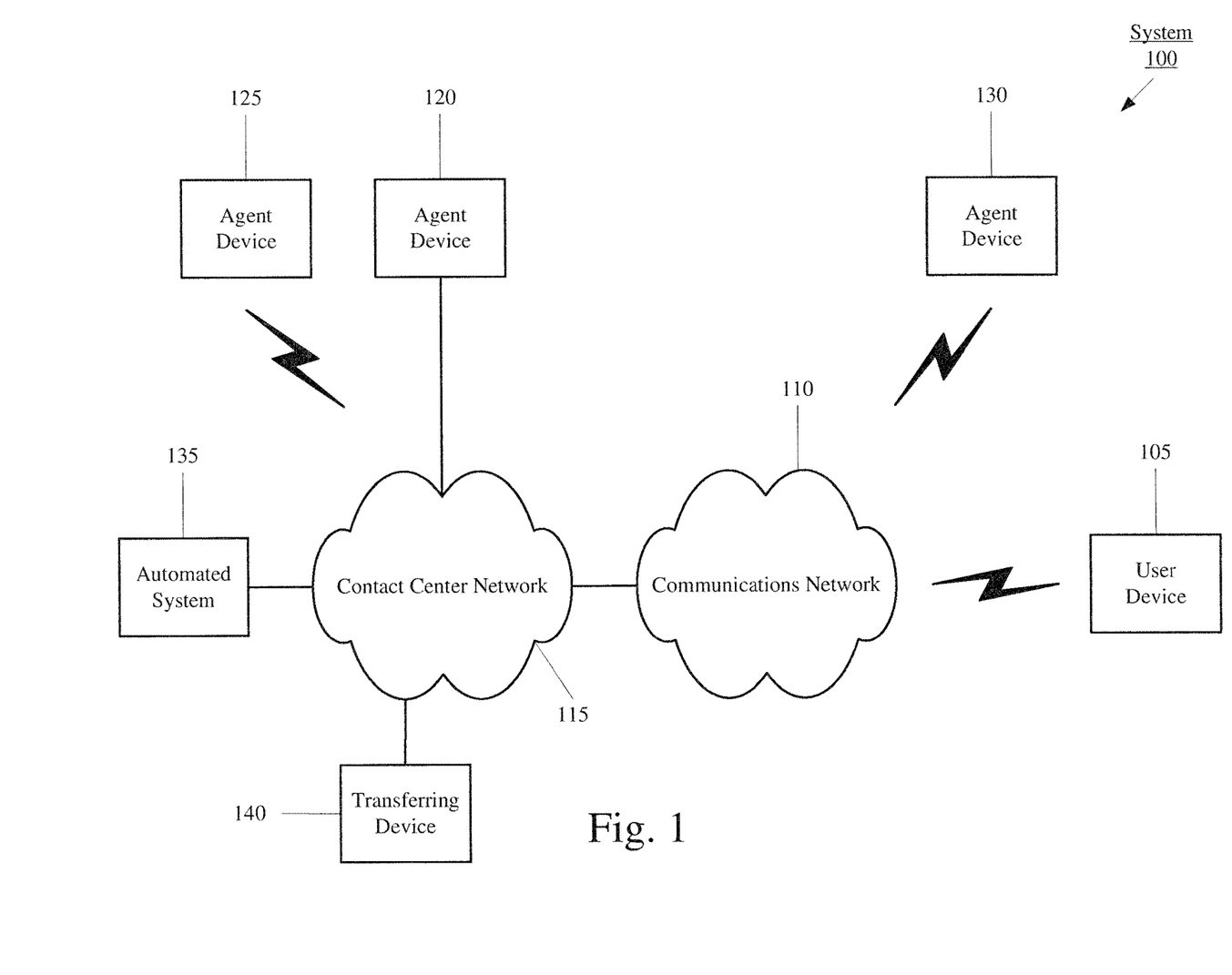
FIG. 1 shows an exemplary contact center system according to the present invention.

FIG. 1 shows an exemplary system 100 according to the present invention including a contact center and a means for a user to communicate with the contact center. The system 100 may utilize a communications network 110 and a contact center network 115 which are communicatively connected to one another. Accordingly, end devices connected to the communications network 110 and/or the contact center network 115 may communicate with each other. The system 100 may enable a user device 105 utilized by a user to transmit a request via the communications network 110 and the contact center network 115 to an agent device 120 utilized by an agent so that a real-time communication may be established therebetween for the request to be discussed during a session (e.g., a chat session). As will be described in further detail below, the system 100 may further include an automated system 135, a transferring device 140, and a supervisor device (not shown). The supervisor device may be utilized by a supervisor who is responsible for a plurality of agents such as those using the agent devices 120-130.

The user device 105 may represent an electronic device in which a user may transmit a request to the contact center network 115. Specifically, the request and its resolution may be performed over a real-time communication (e.g., voice and/or video). For example, the user device 105 may be any electronic component that is configured to communicate via the communications network 110 using the real-time communication such as a desktop computer, a laptop, a smartphone, etc. The user device 105 is shown as wirelessly communicating with the communications network 110. However, it should be noted that the user device 105 may also connect to the communications network 110 using other means such as a wired connection. Accordingly, the user device 105 may include corresponding components to enter the request (e.g., an input/output (I/O) device), to connect to the communications network 110 (e.g., a transceiver), to transmit the request, to perform the video communication (e.g., an imager), etc.

The communications network 110 may represent any single or plurality of networks used by the user device 105 to communicate with the contact center via the contact center network 115. For example, if the user device 105 is a personal home computer, the communications network 110 may include a home network in which the user device 105 may initially connect. The home network may connect to a network of an Internet service provider to connect to the Internet. Subsequently, through the Internet, a connection may be established with the contact center network 115. It should be noted that the communications network 110 and all networks that may be included therein may be any type of network such as a Local Area Network (LAN), a Wide Area Network (WAN), a Virtual LAN (V-LAN), etc. using any variety of radio access networks such as 3G, 4G, Long Term Evolution (LTE), WiFi, etc.

The contact center network 115 may enable a plurality of devices to be interconnected with one another. For example, the contact center network 115 may be a proprietary network accessible in one manner by the agent devices 120-130, the automated system 135, and the monitoring device 140. Specifically, the agent devices 120-130, the automated system 135, and the transferring device 140 may be connected to the contact center network 115 via an authorized or privileged connection for select information and data to be accessed. However, as discussed above, the contact center network 115 may be accessed in another manner via the communications network 110 by the user device 105. This connection may enable communications to be transmitted and/or received between the end devices without access to the above noted information and data, particularly using the video communication.

The contact center network 115 may also enable direct connections thereto using, for example, both wired and wireless connections. Specifically, the agent device 120 may utilize a wired connection to establish the connection with the contact center network 115. The agent device 125 may utilize a wireless connection to establish the connection with the contact center network 115. Furthermore, the agent device 120 and the agent device 125 may be within a predetermined proximity of the contact center network 115 in order to establish the connection. Using an authorization procedure (e.g., login and password), the connection for the agent devices 120, 125 may be established. In addition, the contact center network 115 may enable remote connections thereto using, for example, the communications network 110. For example, an agent may work remotely from a location that is outside the proximity of the contact center network 115 such as the agent device 130. Using authentication, authorization, and accounting (AAA) procedures (via a AAA server), the agent device 130 may establish a connection with the contact center network 115 in a substantially similar manner as the agent devices 120, 125.

In view of the above description of the contact center network 115, it should be noted that the contact center network 115 may include a variety of components (not shown) to enable these functionalities. For example, the contact center network may include a server, a router, a switch center, a network management arrangement, a database, etc. It should also be noted that the use of three agent devices 120-130 is only exemplary. Those skilled in the art will understand that the contact center may utilize any number of agent devices. It should further be noted that the use of one supervisor device 135 is only exemplary. Those skilled in the art will understand that the contact center may utilize any number of supervisor devices to manage one or more agent devices.

Figure 2:
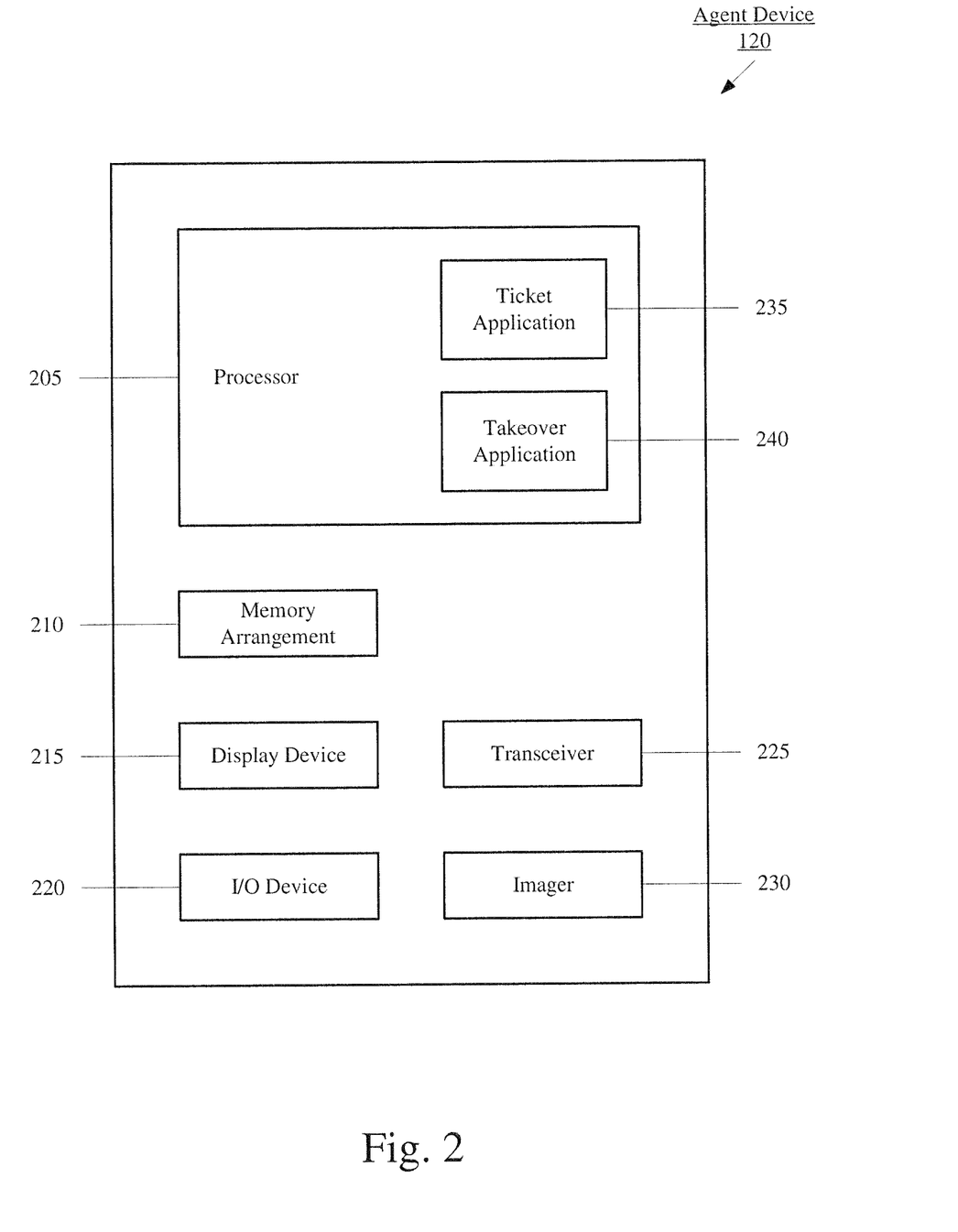
FIG. 2 shows an exemplary agent device of the contact center system of FIG. 1.

FIG. 2 shows the exemplary agent device 120 of the contact center system 100 of FIG. 1. As discussed above, the agent device 120 may be utilized by an agent to receive a request from a user via the user device 105 and to perform a real-time communication therewith. As will be discussed in further detail below, the agent device 120 may have the request in the form of a chat session forwarded thereto from the automated system 135. The agent device 120 may therefore receive information from the automated system 135 relating to a prior exchange between the automated system 135 and the user device 105 that enables the agent to subsequently use a process to determine a response or resolution for the request during the chat session.

The description herein for the agent device 120 may be representative of the agent devices 125, 130 as well. The agent device 120 may also represent any electronic device that is configured to perform the functionalities described herein. For example, the agent device 120 may be a portable device such as a tablet, a laptop, etc. In another example, the agent device 120 may be a client stationary device such as a desktop terminal. The agent device 120 may include a processor 205, a memory arrangement 210, a display device 215, an I/O Device 220, a transceiver 225, an imager 230, and other components (e.g., an audio input device (for use during the video communication relating to the voice input component), an audio output device (for use during the video communication relating to the voice output component), a battery, a data acquisition device, ports to electrically connect the agent device 120 to other electronic devices, etc.).

The processor 205 may be configured to execute a plurality of applications of the agent device 120. For example, the applications may include a web browser when connected to the contact center network 115 and also the communications network 110 via the transceiver 225. In another example, the processor 205 may execute a ticket application 235. The ticket application 235 may include a plurality of tools and receive other information such as from the automated system 135 or determined from other applications such as the web browser. The ticket application 235 may also perform the real-time communication functionality. That is, among the tools provided thereby, the ticket application 235 may have a session with the user forwarded to the agent device 120 from the automated system 135 (e.g., through a switch component of the contact center network 115) and establish the real-time communication session between the agent and the user. In a further example, the processor 205 may execute a takeover application 240. The takeover application 240 may operate in conjunction with the ticket application 235. Specifically, the takeover application 240 may provide the capability of having the session transferred from the automated system 135 to the agent device 120. Accordingly, the takeover application 240 may perform other functionalities associated with the transfer such as providing a transcript of the prior exchange between the automated system 135 and the user device 105. The takeover application 240 may also provide the capability of transferring the session in an opposite direction. As will be described in further detail below, the takeover application 240 may receive an indication from the transferring device 140 that automatically transfers the session from the agent device 120 to the automated system 135. In a specific exemplary embodiment, the transferring device 140 may have an overriding capability in which the transfer is performed automatically without any agent intervention. In a further specific exemplary embodiment, the overriding capability may also prevent the agent from canceling the transfer from being performed.

It should be noted that the above noted applications each being an application (e.g., a program) executed by the processor 205 is only exemplary. The functionality associated with the applications may also be represented as a separate incorporated component of the agent device 120 or may be a modular component coupled to the agent device 120, e.g., an integrated circuit with or without firmware.

The memory 210 may be a hardware component configured to store data related to operations performed by the agent device 120. Specifically, the memory 210 may store data related to the web browser, the ticket application 235, the transferring application 240, etc. For example, the transcript received from the automated system 135 may be stored. The display device 215 may be a hardware component configured to show data to a user while the I/O device 220 may be a hardware component that enables the user to enter inputs such as a keyboard, a mouse, a gesture reading engine from video, etc. It should be noted that the display device 215 and the I/O device 220 may be separate components or integrated together such as a touchscreen.

The transceiver 225 may be a hardware component configured to transmit and/or receive data, particularly related to the video communication. That is, the transceiver 225 may enable the video communication with other electronic devices directly or indirectly through a network based upon an operating frequency of the network. The transceiver 225 may operate on a variety of different frequencies or channels (e.g., set of consecutive frequencies) that are related to the functionalities of the different applications being performed.

As described above, the agent devices 120-130 may execute the ticket application 235. Specifically, the user device 105 may transmit information included in a request such as in the form of a ticket to the contact center. The contact center network 115 may process the ticket and determine an appropriate agent to deliver the ticket to subsequently establish the real-time communication with the user of the user device 105. More specifically, the automated system 135 may be configured to process this initial information (among other functionalities). The automated system 135 may include a processing engine and a transceiver that is configured to exchange information with the user device 105.

As discussed above, the contact center may utilize a chat session as a real-time communication with the user of the user device 105. The chat session may be performed using the automated system 135 which does not require an agent using the agent device 120. The automated performance of the chat session by the automated system 135 may attempt to fully answer a request or gather information. Due to this functionality of the automated system 135, those skilled in the art will appreciate that the automated system 135 engaging with a user may be considered an indeterminately large resource as its capability is greater than an individual agent or potentially all the agents of the contact center. That is, based upon, for example, hardware limitations, applicable session licensing, etc., the automated system 135 may have potentially a limitless capability to offer automated service to a large number of live users. Those skilled in the art will also understand that the automated system 135 may be limited to offer automated responses for topics or progression of the chat that it is familiar with such as through rules based programming, heuristic techniques of historical conversation analysis, knowledge base article consumption, etc. Therefore, at some point, there is likely a need for the automated system 135 to forward the session to a live agent for assistance in continuing the session. However, the automated system 135 may still provide an invaluable resource for contact center, particularly through a more efficient use provided by the exemplary embodiments.

The automated system 135 may be configured with a plurality of functionalities. In a first example, the automated system 135 may be an initial contact for the user of the user device 105. That is, each user device 105 that reaches the contact center may be forwarded to the automated system 135. The automated system 135 may include a greeting functionality that activates a real-time communication (e.g., a chat session) with the user device 105. The greeting functionality may provide a standard greeting as text in the chat session. Subsequently, the automated system 135 may include an information gathering functionality. The information gathering functionality may entail a plurality of inquiries posed to the user of the user device 105 via the chat session. For example, the inquiries may include a list or menu of categories that the user may select in the chat session (e.g., a menu option in a chat window). Subsequent inquiries may be posed upon selection of inputs for the inquiries. For example, a predetermined decision tree may be used in which an input for an inquiry leads to a follow-up inquiry. The information gathering functionality may also or alternatively entail a text parsing functionality such that a general inquiry (e.g., "How may I help you today?") may be responded with free-form text. The text parsing functionality may determine the appropriate category of the request.

In a second example, the automated system 135 may continue the chat session based upon the inputs for the inquiries beyond the standardized set of questions. That is, the processor of the automated system 135 may include an intelligence module that determines a response or follow-up inquiry as the chat session progresses into a more complex discussion with the user of the user device 105. As will be used herein, a "response" may relate to a communication from the contact center to the user device 105 while a "reply" may relate to a communication from the user device 105 to the contact center. For example, the automated system 135 may utilize a confidence mechanism in which potential responses or follow-up inquiries have a confidence value associated therewith. When the confidence value is above a predetermined threshold, the automated system 135 may be configured to continue the chat session using the corresponding response. However, when the confidence value is below a predetermined threshold, the automated system 135 may remove the response from being used in the chat session at the time this determination is made. Furthermore, when the session is transferred from the automated system 135 to the agent device 120, the automated system 135 may use these confidence values to determine when the transfer is to be performed. For example, when the confidence values of all potential responses are below the predetermined threshold, this may indicate that the agent may be more appropriately suited to handle a subsequent portion of the chat session as the complexity may have gone beyond the capability of the automated system 135.

In a third example, the automated system 135 may still continue processing the chat session despite having been transferred to the agent device 120. For example, the automated system 135 may provide suggested responses to the agent device 120 based upon the chat session progression. In a specific example, upon transference of the session from the automated system 135 to the agent device 105, the automated system 135 may also provide all potential responses being considered prior to the transfer (e.g., top three confident responses that fall below the predetermined threshold). Furthermore, while the chat session is with the agent device 105, the automated system 135 may continue this analysis and continue to provide suggested responses.

It should be noted that the automated system 135 may record and store the manner in which the agent proceeds with the chat session and whether the suggested responses are being selected. In this manner, the automated system 135 may be configured with an intelligence system that may update the parameters for determining the confidence level for the potential responses. For example, a first session may have been transferred due to a potential response falling under the predetermined threshold. However, due to the information gathered from this first session, a second session having substantially similar circumstances may result in the potential response having a higher confidence that rises above the predetermined threshold for the session to continue at the automated system 135 without transference to the agent device 120.

In a fourth example, the automated system 135 may be configured to determine the agent device 120 associated with an agent determined to be selected for the transfer of the chat session. For example, the automated system 135 may have access to information of the availability, capabilities, and/or knowledge base of the agents of the contact center. Based upon the progression of the chat session, the automated system 135 may determine the most appropriate agent for which the chat session is to be transferred. Thus, the automated system 135 may transfer the chat session to the agent device 120 corresponding to the determined agent. For example, as discussed above, the agent may log into an agent device using unique credentials that indicate to the automated system 135 the association between the agent and the agent device 120. Those skilled in the art will understand that the selection of the agent may be performed in a variety of manners and the use of qualifications and/or indicators in the chat session are only exemplary.

It should also be noted that the use of the automated system 135 as an initial contact is only exemplary. The exemplary embodiments relate to a mechanism in which the session is transferred from the agent device 120 to the automated system 135. Thus, the agent device 120 may also be configured as the initial contact with the user device 105. That is, the agent of the agent device 120 may perform all of the above functionalities in a manual capacity.

As discussed above, the session may be transferred between the agent device 120 and the automated system 135 in either direction. In a first example, the automated system 135 may initiate the session with the user device 105.

Subsequently, the session may be transferred from the automated system 135 to the agent device 120. This transfer may be performed using any known mechanism. According to the exemplary embodiments, the transfer may also occur in an opposite direction. In a second example of transfer, the agent device 120 may initiate the session with the user device 105. Subsequently, the session may be transferred from the agent device 120 to the automated system 135. In a third example of transfer, the agent device 120 may have had the session transferred thereto from the automated system 135.

Subsequently, the session may be transferred back from the agent device 120 to the automated system 135. This transfer between the agent device 120 and the automated system 135 may be performed in an automatic manner via the transferring device 140. As will be described in further detail below, the transferring device 140 may determine when the automatic transfer from the agent device 120 to the automatic system 135 is to be performed.

Figure 3:
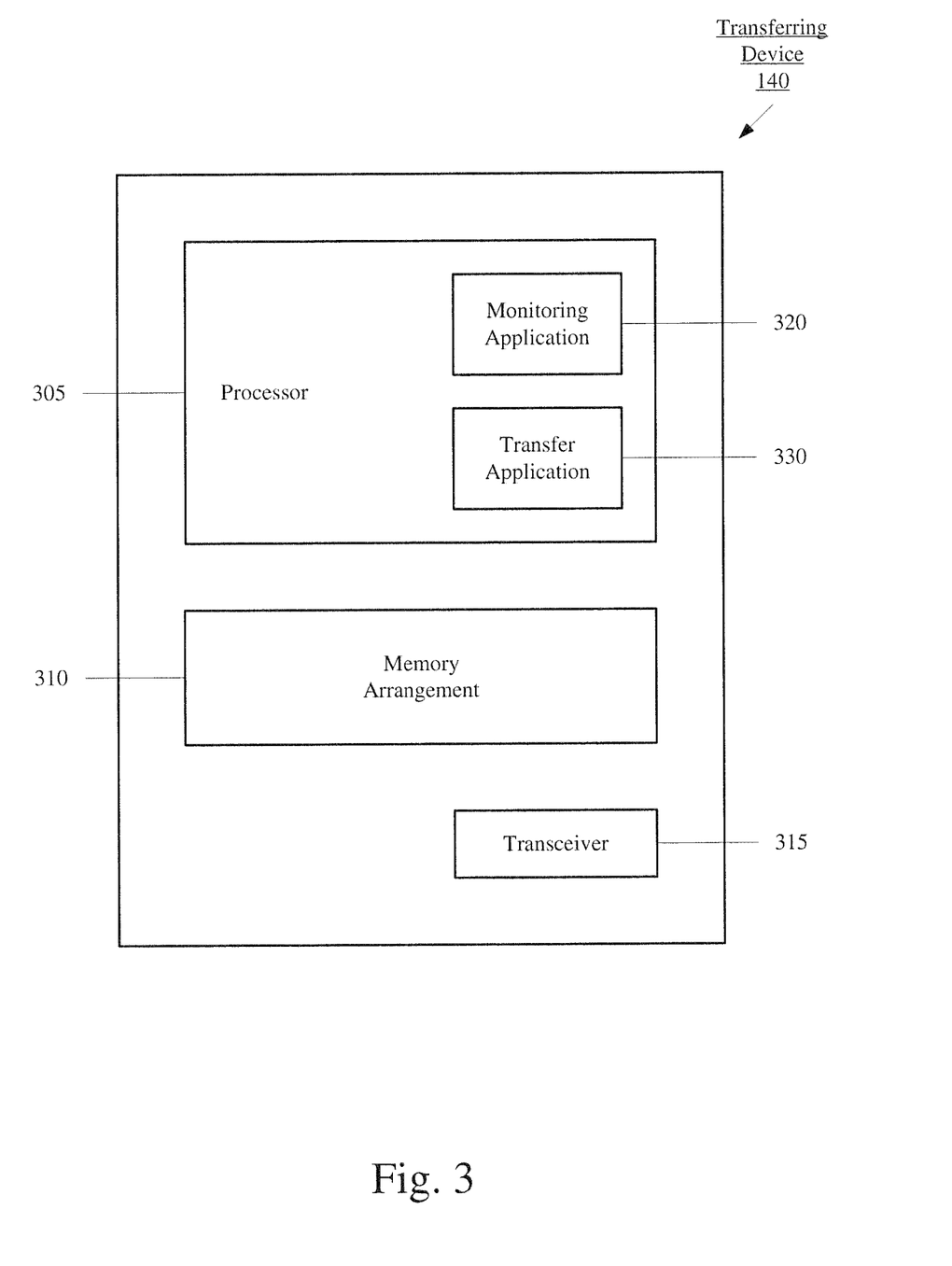
FIG. 3 shows an exemplary transferring device of the contact center system of FIG. 1.

FIG. 3 shows the exemplary transferring device 140 of the contact center system 100 of FIG. 1. The transferring device 140 may provide a mechanism that performs the automated transfer between the agent device 120 and the automatic system 135. Specifically, the transferring device 140 may determine at least one condition that causes a trigger or indication to be transmitted to the agent device 120 or the automated system 135 for the automatic transfer to be performed.

The transferring device 140 may be preconfigured with a variety of parameters to perform the transfers. For example, an administrator or the supervisor may pre-program the transferring device 140 to perform its intended functionality. In another example and as noted above, the transferring device 140 may be configured with a feedback functionality in which the original pre-programming may be updated based upon experiences of sessions that have occurred. In a substantially similar manner as the agent device 120, the transferring device 140 may represent any electronic device that is configured to perform the functionalities described herein. The transferring device 140 may include a processor 305, a memory arrangement 310, and a transceiver 315 that provide functionalities substantially similar to those corresponding to the agent device 120. It should be noted that the transferring device 140 may also include further components such as a display device and an I/O device that enable the administrator to configure the transferring device 140 to perform its intended functionalities. However, it should also be noted that the transferring device 140 may be configured to receive these instructions via the transceiver 215 to automatically implement the policies upon reception.

The processor 305 may be configured to execute a monitoring application 320. The monitoring application 320 may receive an exchange between the user device 105 and one of the agent device 120 or the automated system 135, whichever device is currently progressing the session with the user device 105. For example, a transcript may have been created for the session including the responses from the contact center and the replies from the user device 105. When the automated system 135 initiates the session, the transcript may be created and passed along with the session when transferred to the agent device 120. The transcript may also be provided to the monitoring application 320 that continues the transcript for monitoring purposes. Based upon a current progression and further processing of the transcript (particularly regarding the responses being provided), the monitoring application 320 may provide information of the session that is used to determine whether the session is to be transferred.

The processor 305 may also be configured to execute a transfer application 325. The transfer application 325 may receive information from the monitoring application 320. Based upon this information, the transfer application 325 may determine whether the session is to be transferred from the automated system 135 to the agent device 120 or vice versa. More particularly, the transfer application 325 according to the exemplary embodiments may determine a variety of conditions such as one or more criteria that result in the session being transferred from the agent device 120 to the automated system 135.

The transfer application 325 may be configured to enable more accurate decisions about which chat sessions are to be transferred from a manual process via the agent device 120 to an automated process via the automated system 135. Accordingly, the transfer application 325 may also determine which chat sessions are better served by remaining with the agent of the agent device 120. Those skilled in the art will understand that the agent may have multiple sessions occurring concurrently and that there may be one or more sessions that require more agent attention than others such as a session where the customer is requesting highly complex questions (that may not be properly responded by the automated system 135), provides a response in a relative fast manner with an expectation of the same from the contact center, etc.

Initially, as discussed above, there may be a variety of different criteria that the transfer application 325 may consider when determining when to transfer a session from the automated system 135 to the agent device 120 when the automated system 135 provides the initial contact for the user device 105. When the automated system 135 provides this initial contact functionality, replies may be provided to various inquiries or responses posed to the user device 105 during the chat session. The responses may be determined based upon a predetermined decision tree based upon replies from the user device 105. The automated system 135 may weigh and determine which response has a highest confidence value for selection to be used as the response in the chat session. However, when the determined response having the highest confidence falls below a predetermined threshold, the automated system 135 may determine that the chat session will be better handled by an agent. Thus, this may be one criteria when the transferring device 140 determines that the session is transferred from the automated system 135 to the agent device 120. However, if the responses remain above the predetermined threshold, the automated system 135 may continue to be used.

The session may progress to a point where the automated system 135 is no longer within the preprogrammed categories for which responses are generated. For example, the initial inquiries posed to the user device 105 may be generic to identify a topic for which the request relates. As the request becomes more detailed, the automated system 135 may no longer be capable of providing a response, particularly if there is no preprogramming beyond a particular scope of the request. In such a case, the complexity of the session may be outside the limits of the automated system 135. When such a determination is made, the transferring device 140 may determine to transfer the session from the automated system 135 to the agent device 120. Thus, this may provide another criteria. However, if the automated system 135 has at least one response preprogrammed to continue the session, the automated system 135 may continue to be used (barring any other criteria such as the confidence described above).

The responses may also be provided by the automated system 135 based upon a time required to determine which response is to be used. For example, an initial inquiry may be predetermined and automatically output in the chat session (e.g., "How can I help you today?"). Subsequent inquiries or responses may require at least some processing as the preprogramming of the known categories must be performed based upon the replies provided by the user device 105. As the complexity and details of the session increase, the amount of processing may also increase which may result in an increased time required to provide responses by the automated system 135. However, the user of the user device 105 may be providing replies in a timely manner such as immediately after receiving the response from the automated system 135. When a large enough discrepancy results in the time taken to provide responses by the automated system 135 versus the time taken to receive replies from the user device 105, the transferring device 140 may determine to transfer the session from the automated system 135 to the agent device 120. Accordingly, this may provide a further criteria. If the automated system 135 continues to also provide responses in a timely manner, the automated system 135 may continue to be used.

In the opposing operation of transferring the session from the agent device 120 to the automated system 135, there may also be a variety of different criteria that the transfer application 330 may consider. The different types of criteria may include, for example, contact center capacity, agent capacity, confidence of suggested responses, response time of agent, response analysis, etc. These criteria may be used individually or in combination with one another (e.g., two or more) for the transfer application 330 to determine when the session is to be transferred from the agent device 120 to the automated system 135.

In a first exemplary criteria, an overall workload of the contact center may be determined by the transferring device 140. As discussed above, the transferring device 140 may have a proprietary authorization to connect to the contact center network 115. More specifically, the transferring device 140 may have information associated with the workload of the contact center. The workload of the contact center may relate to a current number of ongoing sessions by available agents of the contact center. In the example illustrated in FIG. 1, there may be three total agents using agent devices 120-130 in which each agent may be allowed to handle up to five sessions concurrently. Thus, the contact center may have a total capacity of fifteen sessions at any given time to be performed by the agents. According to this first criteria, the transfer application 330 may determine an actual number of concurrent sessions being performed by the agents. Continuing with this example, the transfer application 330 may determine that only twelve sessions are being handled by the agents. Thus, the overall workload of the contact center is under its capacity. Accordingly, the transfer application 330 may determine that a session currently being handled by the automated system 135 may be transferred to one of the agent devices 120-130. Conversely, if the transfer application 330 determines that fifteen sessions are being handled by the agents, the overall workload of the contact center is at its capacity. Accordingly, the transfer application 330 may determine that all of the sessions currently being handled by the automated system 135 is to remain with the automated system 135.

It should be noted that the criteria of the workload of the contact center impliedly includes further considerations. For example, in a second exemplary criteria, the load factor of the individual agents may be used to determine whether a transfer of a session is to be performed. That is, the workload of the contact center may also consider an availability of other agents to handle additional sessions. Further continuing with the above example in which the workload of the contact center is at twelve sessions being performed by the agents, the agent device 120 may currently be handling its capacity of five sessions while the agent devices 125, 130 may currently be handling under its capacity such as the agent device 125 handling four sessions and the agent device 130 handling three sessions. In this manner, the transfer application 330 may further determine that no further sessions are to be transferred to the agent device 120. In a further example, a session being handled by the automated system 135 may require a transfer. Although the agent using the agent device 120 may be the most appropriate for the transfer, the transfer application 330 may be aware of the capacity and instead transfer the session to one of the other available agent devices 125, 130. In yet another example, a session being handled by the agent of agent device 120 may be determined to return to automation such that the agent device 120 is to handle a new incoming session (e.g., since the agent using the agent device 120 may be the only appropriate resource for the session). Thus, a double transfer may take place in which a session being handled by the agent of agent device 120 is transferred to the automated system 135 while a new session being handled by the automated system 135 is transferred to the agent device 120, thereby again filling the capacity. In this manner, the workload of the contact center and the load factor of the agent may be balanced with a corresponding threshold (e.g., a predetermined workload threshold for workload and a predetermined load factor threshold for the load factor) to determine when the transfer is to be performed.

In a third exemplary criteria, the confidence level of the responses suggested by the automated system 135 may be considered. As discussed above, when the session is at the automated system 135 and the responses are considered to fall below a predetermined threshold, the transferring device may transfer the session from the automated system 135 to the agent device 120. Also as discussed above, the automated system 135 may continue to monitor the progress of the session even after the transfer for a variety of reasons. One exemplary reason is to provide suggested responses to the agent device 120. Although the responses may have dropped below the predetermined threshold while the session was still at the automated system 135, latter suggested responses while the session is at the agent device 120 may subsequently rise above the predetermined threshold after the agent has progressed the session. Thus, in a first manner of using this criteria, when any suggested response is determined to again be above the predetermined threshold, the transfer application 330 may automatically transfer the session from the agent device 120 to the automated system 135. In a second manner of using this criteria and to increase a likelihood that the automated system 135 may be used for the session to provide correct responses, the transfer application 330 may automatically transfer the session from the agent device 120 to the automated system 135 when at least a select number of consecutive suggested responses are above the predetermined threshold.

In a fourth exemplary criteria, the response time of the agent using the agent device 120 that is handling the session may be considered. As discussed above, the agent using the agent device 120 may be assigned a plurality of concurrent sessions. Although the agent may devote full attention when only one session is being handled, the agent's attention must be split when more than one session is being handled by the agent. With more sessions being allowed to be handled by the agent and more sessions being allocated to the corresponding agent device, the agent's attention decreases. Furthermore, one of the sessions being handled by the agent may require more of the agent's attention that further decreases the attention provided to the remaining sessions. Accordingly, the transfer application 330 may determine when a time between responses goes above a predetermined threshold or other standard (e.g., a peer average time of other agents, mean time between responses performed by the agent, etc.). The predetermined threshold may be selected based upon an acceptable amount of time that the user should wait after providing a reply. Thus, when the time is above the predetermined threshold, the transfer application 330 may transfer the session from the agent device 120 to the automated system 135. However, if the agent is capable of providing a response within the predetermined threshold, the session may remain with the agent device 120.

In a fifth exemplary criteria, an analysis of the responses being provided may be considered. Specifically, the transfer application 330 may determine whether the suggested responses provided by the automated system 135 is being used at a certain frequency by the agent of the agent device 120. In other words, the transfer application 330 may determine a level of input by the agent in providing the responses to the user device 105. For example, if the agent is performing a variety of searches or other functions to find requested information with no suggested responses being provided or without any consideration of provided suggested responses, the transfer application 330 may determine that the agent may be preferred or required for the session. However, in another example, if the agent is simply accepting a majority or all of the suggested responses provided by the automated system 135 or is providing responses that substantially correspond to the suggested responses, the transfer application 330 may determine that the agent's capacity and time may be freed up from this session by transferring this session to the automated system 135 that may perform the session in a substantially similar as the agent.

It should be noted that this transfer may be performed even if the suggested responses are below the predetermined threshold associated with confidence values. The transfer application 330 may determine that the suggested responses do not satisfy the confidence criteria but that the session still uses these under-confident responses (by the agent). Therefore, the transfer application 330 may also determine that the automated system 135 may be used preferentially to avail the agent as a resource again.

According to the exemplary embodiments, the above criteria or a combination thereof may enable the transferring device 140 to determine if a session currently being handled by an agent using the agent device 120 is better served by removing it from the current agent and assigning it to the automated system 135. For example, the overall workload of the contact center and the lad factor of the individual agents may provide individual determinations of when to transfer sessions between the agent device 120 and the automated system 135. In another example, the confidence factor of the suggested responses and the response analysis may be used in some associated manner to determine when to transfer sessions between the agent device 120 and the automated system 135. When the transferring device 140 determines that the transfer is to be performed from the agent device 120 to the automated system 135, the transfer application 330 may generate a corresponding signal (e.g., a control signal, a transfer signal, etc.) to be transmitted to the takeover application 240. As discussed above, when the takeover application 240 receives this signal or indication, the session may be automatically transferred outside the control of the agent.

It should be noted that the transferring device 140 may also consider when to transfer the session from one agent (e.g., the agent using the agent device 120) to another agent (e.g., the agent using the agent device 125). As discussed above, when a first agent is at capacity but an incoming session requires the attention of this first agent, a session of the first agent may be transferred to a second agent to create capacity for the incoming session. However, in determining this transfer, the transferring device 140 may further consider a time required for the second agent to catch up on the progression of the session. As the catch-up time will most likely require a relatively significant amount of time, this catch-up time may be used to determine whether such a transfer is still acceptable under the current circumstances. A substantially similar analysis may also be performed for the transfer from the automated system 135 to the agent device 120 with the transmission of the transcript and time required for the agent to review the in-progress session prior to takeover.

Figure 4:
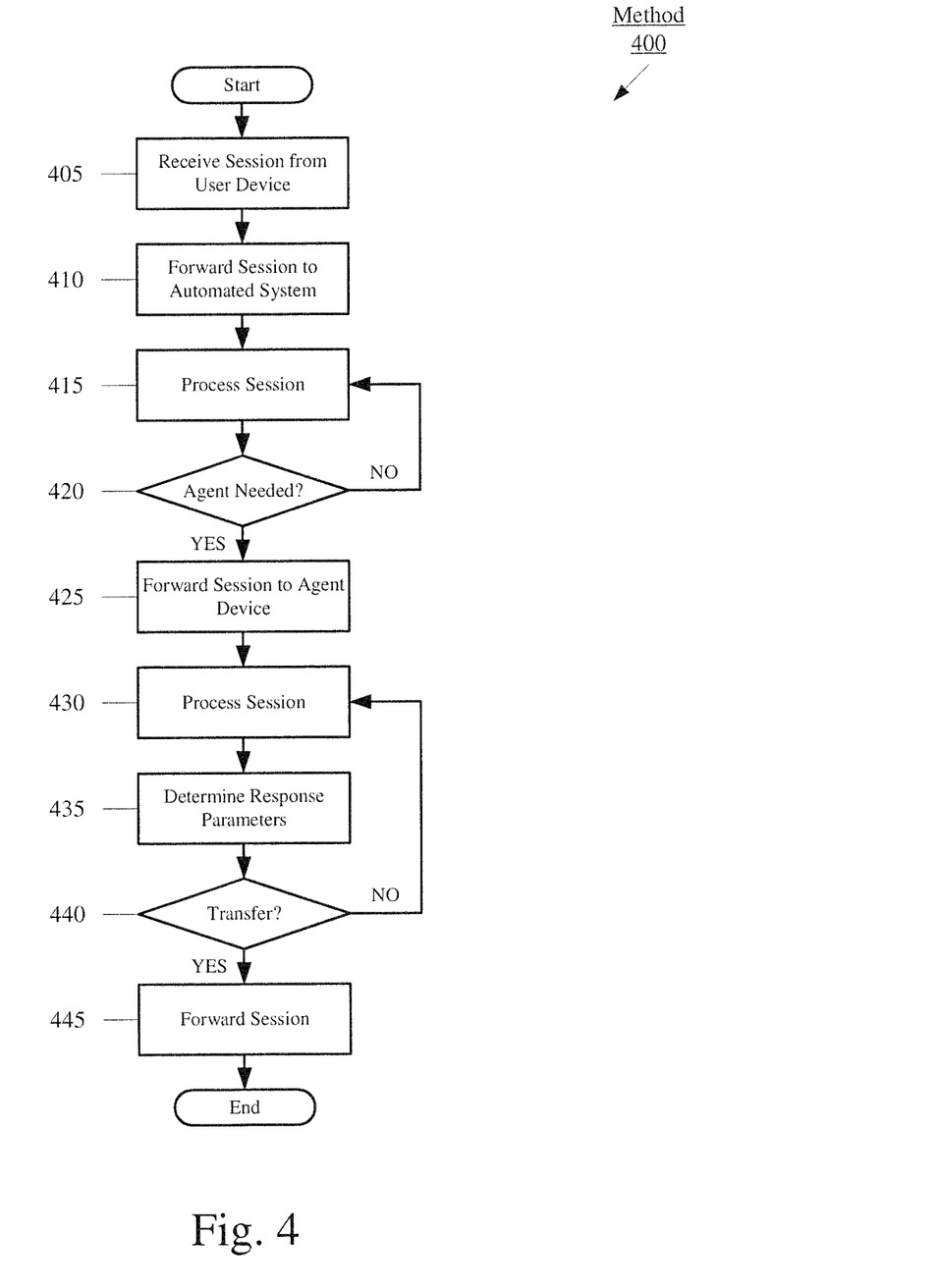
FIG. 4 shows an exemplary method for determining when to transfer a session between an agent device and an automated system.

FIG. 4 shows an exemplary method 400 for determining when to transfer a session between the agent device 120 and the automated system 135. More particularly, the method 400 describes an overall procedure for handling incoming sessions from the user device 105 where the automated system 135 provides an initial contact functionality. The method 400 further determines when a session at the agent device 120 is to be transferred back to the automated system 135. It should again be noted that the use of the automated system 135 performing the initial contact functionality is only exemplary and that the agent device 120 may represent any of the agent devices of the contact center. The method 400 will be described with reference to the contact center system 100 of FIG. 1, the agent device 120 of FIG. 2, and the transferring device 140 of FIG. 3.

In step 405, the contact center receives a communication from the user device 105. The user device 105 may contact the contact center in a variety of different manners. For purposes of the exemplary embodiment, the user of the user device 105 may utilize a chat option that enables a near real-time communication to be established between the user device 105 and the contact center. Thus, a chat session may be formed between the user device 105 and the contact center.

In step 410, the communication may be forwarded to the automated system 135 because the automated system 135 is configured with the initial contact functionality. As discussed above, the initial contact functionality may entail the automated system 135 providing a greeting and receiving replies from the user device 105 for responses to determine a category for which the request relates. Thus, in step 415, the automated system 135 may process the session. It should be noted that while the session is being processed by the automated system 135, the monitoring application 320 of the transferring device 140 may monitor this processing.

In step 420, the transfer application 330 determines whether an agent is required for the session. As discussed above, the monitoring application 320 may receive information from the automated system 135 and/or monitor the progress of the session to determine whether the responses being used satisfy selected criteria such as being above a predetermined confidence threshold. If the responses satisfy these criteria, the session may continue to be processed by the automated system 135. However, if the responses no longer satisfy the criteria, the transfer application 330 continues the method 400 to step 425 where the session is forwarded from the automated system 135 to the agent device 120. Specifically, the transfer application 330 may operate in conjunction with the takeover application 240 for the transfer to be performed. It should again be noted that the transfer to the agent device 120 may include providing a transcript or other information from the monitoring application 320 of the transferring device 140 and/or the automated system 135 to the ticket application 235 of the agent device 120. Therefore, the agent may be aware of the parameters of the session and a current point where the automated system 135 was stopped being used.

In step 430, the agent using the agent device 120 may continue to process the session. As discussed above, the ticket application 235 may enable the agent to perform the session with the user of the user device 105. For example, searches may be performed or other information may be retrieved in order to form responses for the replies of the user device 105. In another example, the ticket application 235 may receive suggested responses from the automated system 135. Because the automated system 135 may also continue to monitor the progress of the session, such a functionality may be available.

In step 435, the monitoring application 320 and the transfer application 330 of the transferring device 140 may determine response parameters. Specifically, the response parameters may relate to the above described criteria used to determine whether the session is to be transferred back from the agent device 120 to the automated system 135. Therefore, the transfer application 330 may consider response parameters such as a confidence level of responses, a response time, an analysis of responses, etc. The transfer application 330 may also consider other factors including those described above such as workload of the contact center and the load factor of the agent using the agent device 120.

In step 440, the transfer application 330 determines whether the session is to be transferred back to the automated system 135. If the session is determined to remain with the agent device 120, the transfer application 330 returns the method 400 to step 430. For example, the contact center and the agent may be under capacity. Therefore, the session may remain without adversely affecting any other operation. In another example, the agent may be uniquely qualified in handling the session such as having the capability when the purview of the automated system 135 is passed. However, if the session is determined to be transferred back to the automated system 135, the transfer application 330 continues the method 400 to step 445 where the session is forwarded. For example, the transfer application 330 may generate a signal to be transmitted to the takeover application 240. The takeover application 240 may override any operation relating to the session and transfer the session to the automated system 135.

It should be noted that the above described mechanism of using a signal generated by the transfer application 330 and transmitted to the takeover application 240 for the automatic transfer of the session is only exemplary. Those skilled in the art will understand that the exemplary embodiments may utilize other pathways for the automatic transfer of the session to be performed. For example, the transfer application 330 may determine that the transfer is to be performed. The automated system 135 may perform a set of operations such that when indicated, receives the session from the agent device 120. In another example, the contact center network 115 may include an administrative component that receives the indication from the transfer application 330 to perform a set of operations for the transfer of the session to occur.

The exemplary embodiments provide a system and method of optimizing an agent time as a resource to handle sessions with users by further optimizing a use of an automated system that is also configured to handle sessions. The use of the automated system may be optimized by utilizing the automated system whenever possible such that the agent may handle sessions that the automated system may not be configured to address. Specifically, the agent may have a session automatically transferred to the automated system when a determination is made that the automated system may properly continue the session and provide high confidence responses to replies from the user.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
in a transferring device of a contact center:
monitoring a communication session between an agent device used by an agent of the contact center and a user device used by a user, wherein the communication session comprises a plurality of communications;
receiving a communication of the plurality of communications from the user device during the communication session;
upon determining that a first amount of time taken for the agent device to provide a response to the communication is greater than a threshold amount of time, automatically transferring the communication session from the agent device to an automated system of the contact center.

2. The method of claim 1, further comprising:
monitoring a second communication session between the agent device and a second user device used by a second user;
determining a frequency in which the agent uses responses suggested by the automated system on the second communication session relative to responses provided by the agent on the second communication session; and
upon determining that the frequency is greater than a threshold frequency, automatically transferring the second communication session from the agent device to the automated system.

3. The method of claim 1, further comprising:
before monitoring the communication session, automatically transferring the communication session with the user device from the automated system to the agent device.

4. The method of claim 1, wherein the threshold amount of time comprises one of a predetermined value, an average response time of other agents, or a mean time between responses performed by the agent.

5. The method of claim 1, wherein automatically transferring the communication session comprises:
transmitting a control signal to the agent device, wherein a takeover application executing on the agent device, in response to the control signal, transfers the communication session from the agent device.

6. A system comprising: one or more computer readable storage media; a processor operatively coupled with the one or more computer readable storage media; and program instructions stored on the one or more computer readable storage media that, when read and executed by the processor, direct the processor to:
monitor a communication session between an agent device used by an agent of a contact center and a user device used by a user, wherein the communication session comprises a plurality of communications;
receive a communication of the plurality of communications from the user device during the communication session;
upon determining that a first amount of time taken for the agent device to provide a response to the communication is greater than a threshold amount of time, automatically transfer the communication session from the agent device to an automated system of the contact center.

7. The system of claim 6, wherein the program instructions further direct the processor to:
monitor a second communication session between the agent device and a second user device used by a second user;
determine a frequency in which the agent uses responses suggested by the automated system on the second communication session relative to responses provided by the agent on the second communication session; and
upon determining that the frequency is greater than a threshold frequency, automatically transfer the second communication session from the agent device to the automated system.

8. The system of claim 6, wherein the program instructions further direct the processor to:
before monitoring the communication session, automatically transfer the communication session with the user device from the automated system to the agent device.

9. The system of claim 6, wherein the threshold amount of time comprises one of a predetermined value, an average response time of other agents, or a mean time between responses performed by the agent.

10. The system of claim 6, wherein to automatically transfer the communication session, the program instructions direct the processor to at least:
transmit a control signal to the agent device, wherein a takeover application executing on the agent device, in response to the control signal, transfers the communication session from the agent device.

11. A method comprising:
in a transferring device of a contact center:
monitoring a communication session between an agent device used by an agent of the contact center and a user device used by a user;
determining a frequency in which the agent uses responses suggested by an automated system of the contact center on the communication session relative to responses provided by the agent on the communication session; and upon determining that the frequency is greater than a threshold frequency, automatically transferring the communication session from the agent device to the automated system.

12. The method of claim 11, further comprising:

monitoring a second communication session between the agent device and a second user device used by a second user;

receiving a communication from the user device over the second communication session;

upon determining that a first amount of time taken for the agent device to provide a response to the communication is greater than a threshold amount of time, automatically transferring the second communication session from the agent device to the automated system.

13. The method of claim 11, wherein the automated system provides the responses to the agent device.

14. The method of claim 11, further comprising:

before automatically transferring the communication session, determining confidence values in the responses; and wherein automatically transferring the communication session comprises automatically transferring the communication session even though the confidence values do not satisfy confidence criteria.

15. The method of claim 11, wherein automatically transferring the communication session comprises:

transmitting a control signal to the agent device, wherein a takeover application executing on the agent device, in response to the control signal, transfers the communication session from the agent device.

16. A system comprising:

one or more computer readable storage media;

a processor operatively coupled with the one or more computer readable storage media; and program instructions stored on the one or more computer readable storage media that, when read and executed by the processor, direct the processor to:

monitor a communication session between an agent device used by an agent of a contact center and a user device used by a user;

determine a frequency in which the agent uses responses suggested by an automated system of the contact center on the communication session relative to responses provided by the agent on the communication session; and upon determining that the frequency is greater than a threshold frequency, automatically transfer the communication session from the agent device to the automated system.

17. The system of claim 16, wherein the program instructions further direct the processor to:

monitor a second communication session between the agent device and a second user device used by a second user;

receiving a communication from the user device over the communication session;

upon determining that a first amount of time taken for the agent device to provide a response to the communication is greater than a threshold amount of time, automatically transferring the second communication session from the agent device to the automated system.

18. The system of claim 16, wherein the automated system provides the responses to the agent device.

19. The system of claim 16, wherein the program instructions further direct the processor to:

before automatically transferring the communication session, determine confidence values in the responses; and wherein the communication session is automatically transferred even though the confidence values do not satisfy confidence criteria.

20. The system of claim 16, wherein to automatically transfer the communication session, the program instructions direct the processor to at least:

transmit a control signal to the agent device, wherein a takeover application executing on the agent device, in response to the control signal, transfers the communication session from the agent device.

* * * * *